July 20, 1965
G. L. TRAVERS
3,195,601
SAFETY TIRE COVERS FOR VEHICLE WHEELS
Filed Dec. 19, 1963
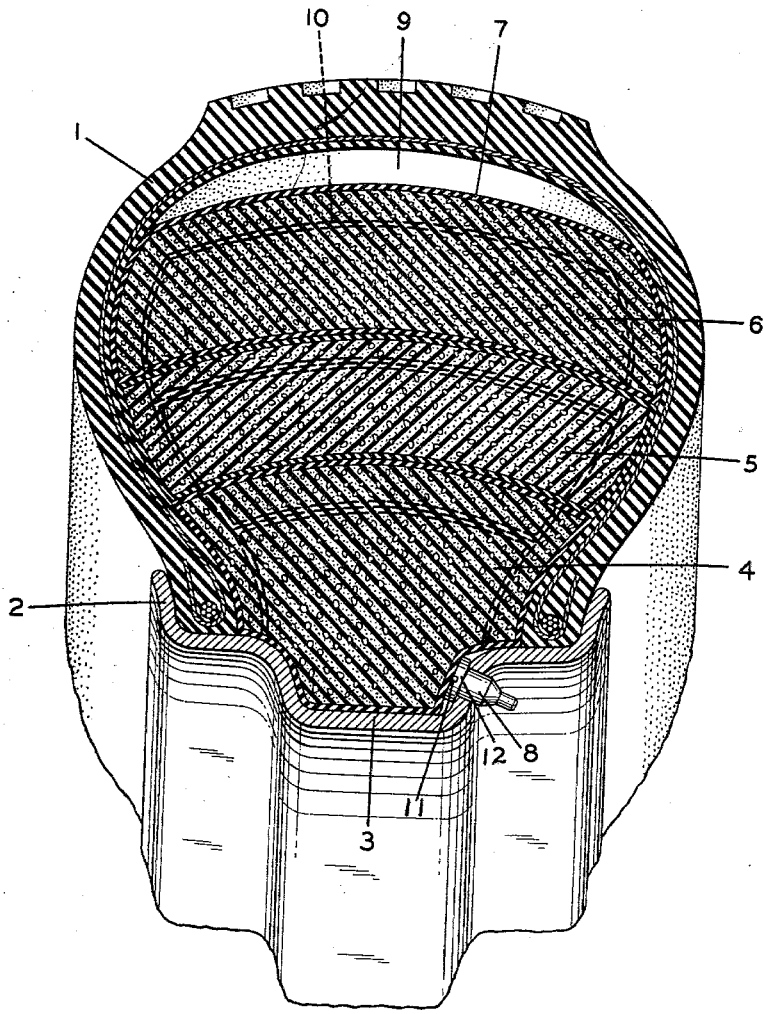
INVENTOR
GEORGES LOUIS TRAVERS
BY
HIS ATTORNEYS

United States Patent Office 3,195,601
Patented July 20, 1965

3,195,601
SAFETY TIRE COVERS FOR VEHICLE WHEELS
Georges Louis Travers, Clermont-Ferrand, France, assignor to Compagnie Generale des Etablissements Michelin, Raison Sociale Michelin & Cie, Clermont-Ferrand, France
Filed Dec. 19, 1963, Ser. No. 331,799
Claims priority, application France, Dec. 20, 1962, 919,351
5 Claims. (Cl. 152—313)

This invention relates to safety tires for vehicles such as, for example, passenger vehicles, trucks, tractors, buses, road building equipment and off-highway vehicles, and it relates more particularly to improvements in the type of safety tires including a pneumatic tire casing containing a filler of a rubbery resilient foam for supporting the load on the tire in case of a partial or complete deflation of the tire casing.

In accordance with the invention, a filler for a pneumatic tire casing is provided which can be inserted into and removed from the tire casing with a minimum of difficulty and which is highly resistant to deterioration or damage by friction and overheating inside the tire casing.

More particularly, in accordance with the invention, the filler is composed of at least two concentric resilient rings of foam-like or cellular material containing gas-tight cells and having a gas-tight sheath or cover united with and enclosing the cellular mass. The rings are fitted one within the other concentrically but are separate so that they can be assembled one within the other in the tire casing, thereby greatly facilitating the insertion of the filler into, and its removal from, the tire casing. The resilient mass of cellular or foam-like material can be composed of any of a number of well known elastomeric foams such as natural rubber foam, synthetic rubber foam, e.g., neoprene or butyl rubber foam, or synthetic plastic foams, such as polyurethane or polyester foam, or polyurethane-polyester foams, and the like. The cellular material from which each of the rings is formed may be, and preferably are, different in their physical and mechanical properties. Thus, the outermost ring of cellular material, i.e., adjacent the crown or tread of the tire casing, should have high resistance to deterioration by friction, impact and heat. The ring adjacent the rim of the wheel should have good heat conductivity while if intermediate rings are provided, they should have high resiliency in order to add flexibility to the filler. The air-tight skin or sheath on the rings can be formed of the same material as the ring itself and may be applied during the curing and molding of the foam into the rings. For example, the gas-tight skin or sheath may be formed of unaerated material of the same kind as the aerated or gasified material from which the foam is made, or if a gas-forming agent is included in the composition to produce the foam, such a gas-forming material is omitted from the material of which the sheath is composed. The sheathing composition can be applied to the surface of the mold before introduction of the foamed or foaming material therein. The presence of the air-tight or gas-tight sheath is important for the reason that it prevents gradual diffusion and escape of the gas from the discrete cells in the foam by diffusion through the cell walls and also tends to maintain a uniform gas pressure within the cells when the ring is subjected to pressure under the load applied by the vehicle when the pneumatic tire casing is partially or completely deflated.

It has been found desirable in order to minimize development of heat in the tire casing due to the presence of the filler therein to provide the filler with such dimensions that prior to its installation in the tire cover and at atmospheric pressure the filler has a volume slightly less than the space within the tire casing and a shape which is different from the space within the tire casing. In this way, a circumferential cavity is provided between the radially outer wall of the outermost ring of the radially inner wall of the crown of the non-inflated tire cover. When the casing is inflated, the outer ring and the crown of the tire cover are out of contact, except when the tire is operating over very rough ground or the tire casing undergoes a slight loss of pressure. In this way, friction between the filler and the tire casing is minimized and the friction can further be reduced by applying a liquid or solid lubricant to the surfaces of the ring or to the inside wall of the tire casing. If desired, a lubricant can be included in the composition forming the sheath or cover of each ring so that it can diffuse to the outer surface and thereby lubricate the filler over long periods of time.

Inasmuch as the inflation pressure of the tire casing is normally higher than the pressure of the gas contained in the discrete cells of the rings of the filler, the latter is compressed against the rim and out of contact with the tire casing so that it does not support the casing during normal operation of the tire, thereby preserving the life of the tire casing and the comfort afforded by the tire. However, in case of deflation or partial deflation of the tire, the safety filler will expand and tend to recover its normal dimensions while carrying the load of the tire casing without permitting the latter to collapse excessively. The support provided by the filler enables the vehicle to continue operating at a sustained speed for several hours. The foam material or materials of which the rings of the filler are composed are subjected to heavy stresses during operation of the vehicle with a deflated tire casing and some of the cells may be ruptured or the pressure may cause diffusion of gas through the walls of the cells. Even under these conditions, the tire sheath or covering of the rings prevents loss or escape of the cellular gas from the rings and maintains the overall resiliency of the filler. Also, the combination of a plurality of rings, each forming a closed cell, reduces gas diffusion and loss for the reason that each ring is capable of deforming independently of the others, thereby contributing also to the gas tightness of the rings. Moreover, damage to any one of the rings does not affect the gas tightness of the other rings which can continue to support the load. The provision of the skin or sheath on the rings also renders the rings more resistant to wear, tearing and mechanical strains for the reason that the skins or sheaths generally are thicker than the walls of the cells.

For a better understanding of the present invention, reference may be had to the accompanying drawing in which the single figure is a view in cross-section through a typical tire casing containing a safety filler embodying the present invention.

As shown in the figure, a typical tire unit includes a tubeless tire casing 1 which may be of conventional type, and is sealed in gas-tight relation to the rim 2 of a vehicle wheel which contains a center groove 3. The safety filler illustrated in the figure consists of three superimposed rings 4, 5 and 6 made of foam rubber-like material, the cells of which do not communicate and contain a gas under pressure. The foam material can be made by any of conventional processes, such as, for example, by aerating a latex of rubber, synthetic rubber, e.g., neoprene rubber, butyl rubber or the like, a synthetic plastic material, e.g., polyurethane, polyester, polyester-urethane plastic, or by including a gas-forming material such as, for example, hydrogen peroxide in the latex composition. An unaerated composition of the same type as the foam or an unaerated material free of gas-forming material is used to coat a mold into which the foamed material or the material in the process of foaming is introduced and the material is then set or cured to produce a ring having the gas-tight sheath 7 on its outer surface.

As shown on the drawing, the filler composed of the rings 4, 5 and 6 is somewhat smaller in its radial dimension than the internal radial dimension of the tire casing so that a free space 9 exists between the crown portion of the tire casing and the radially outer surface of the ring 6.

When the inflating gas or air is introduced into the tire cover through a valve 8 to inflate the tire to a desired pressure, the filler composed of the rings 4, 5 and 6 is compressed inwardly in all directions and as a result is forced tightly around the rim and out of contact with the inner walls of the tire casing as indicated by the dotted line 10 on the drawing. Accordingly, during normal operation, the filler does not carry any load other than that applied by the gas pressure in the tire. Whenever the inflation pressure of the tire casing drops below the pressure of the gas contained in the cells of the rings 4, 5 and 6, they expand to their normal size and if the pressure in the tire casing drops to atmospheric, the load on the wheel is borne substantially entirely by the filler rings.

Regard must be had to the forces and conditions under which the rings operate and accordingly, they may be formed of the same or different types of materials depending upon service conditions. The outer ring 6 should be formed of a foamed material which has high resistance to tearing and wear. For this purpose, a neoprene foam or a polyurethane foam has proved to be very satisfactory. The intermediate ring 5 is less subject to wear and mechanical damage, and therefore may be made of a material having high resiliency or flexibility. For this purpose, a natural rubber foam or a butyl rubber foam is entirely satisfactory. The inner ring should be highly resilient and also should have good heat conductivity in order to dissipate or conduct heat from within the tire casing to the rim. To that end, the inner ring may be composed of any of the above-mentioned foam materials and its conductivity is enhanced by including in the composition very fine metal filaments or metallic particles which form heat-conducting paths through the foam material. Inasmuch as the filler under normal atmospheric pressure substantially fills the inner portion of the tire, provision should be made for enabling the introduction of gas through the filler valve and discharge of gas through the filler valve without blockage by the inner ring 4. To that end, the valve 8 may be provided with laterally extending grooves or apertures 11 in the valve head 12 and the rings 4, 5 and 6 may also be provided with peripheral grooves (not shown) on their sides extending radially or non-radially as desired to enable the gas to flow from within the casing to the valve.

While three rings are illustrated in the drawing as forming the filler for the tire casing, it will be understood that only two rings may be required for smaller tires or in the case of larger tires, the number of rings may be more than three. Also, while the cells of the foam of which the rings are formed contain gas at about atmospheric pressure, the gas may be at super-atmospheric pressure by forming the foam and molding the rings under conditions of super-atmospheric pressure and the total volume of the filler may be equal to or greater than the internal volume of the casing, at atmospheric pressure.

The resiliency of the rings may be made greater or less by varying the pressure of the gas of the cells therein and the type of material from which the rings are formed and the thickness of the skin or sheath around the rings likewise may be varied. However, for gas tightness, the sheath should not be substantially less than $\frac{1}{32}$ of an inch thick and may be very substantially thicker, up to $\frac{1}{8}$ of an inch or thicker, depending upon service conditions. Also, while the tire casing is illustrated as being mounted on a unitary drop-center rim having fixed rim flanges, it will be understood that the rim may have a removable rim flange to facilitate installation and removal of tires of heavy duty vehicles.

Accordingly, the form of the invention shown in the drawing should be considered as illustrative and the scope of the invention is limited only as defined in the following claims.

I claim:

1. A safety filler for a pneumatic tire casing comprising at least two rings assembled concentrically one on the other, each ring including an annular resilient foam-like mass having gas-tight cells containing a gas under pressure and an outer sheath of gas-tight material united with and enclosing said foam-like mass, and heat-conducting metallic filaments in the foam-like mass of the innermost ring.

2. The safety filler set forth in claim 1 in which the foam-like material of the outermost ring comprises polyurethane foam.

3. The safety filler set forth in claim 1 in which the foam-like material of the outermost ring comprises neoprene foam.

4. A safety filler for a pneumatic-type casing comprising at least three rings assembled concentrically one on the other, each ring including an annular resilient foam-like mass having gas-tight cells containing a gas under pressure and an outer sheath of gas-tight material united with and enclosing said foam-like mass, the outermost ring having high resistance to tearing, the innermost ring having higher heat-conductivity than said outermost and intermediate rings and the intermediate ring having higher resiliency than said outermost ring.

5. A safety filler for a pneumatic tire casing comprising at least two rings assembled concentrically one on the other, each ring including an annular resilient foam-like mass having gas-tight cells containing a gas under pressure and an outer sheath of gas-tight material united with and enclosing said foam-like mass, the outermost ring being resistant to tearing, and the innermost ring containing a heat-conductive material.

References Cited by the Examiner

UNITED STATES PATENTS

| | | | |
|---|---|---|---|
| 1,388,843 | 8/21 | Biesmeyer et al. | 152—315 |
| 1,470,048 | 10/23 | Barker | 152—313 |
| 1,587,486 | 6/26 | Marshall | 152—313 |
| 2,237,182 | 4/41 | Iknayan | 152—313 X |
| 3,022,810 | 2/62 | Lambe | 152—313 |

FOREIGN PATENTS 999,831  10/51  France.

ARTHUR L. LA POINT, *Primary Examiner.*